United States Patent
Coldwate et al.

(10) Patent No.: US 9,825,510 B2
(45) Date of Patent: Nov. 21, 2017

(54) VARIABLE GAP ELECTRICAL MACHINES

(71) Applicant: Hamilton Sundstrand Corporation, Charlotte, NC (US)

(72) Inventors: Joseph K. Coldwate, Roscoe, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 33 days.

(21) Appl. No.: 15/097,645

(22) Filed: Apr. 13, 2016

(65) Prior Publication Data

US 2017/0302138 A1    Oct. 19, 2017

(51) Int. Cl.
| | |
|---|---|
| H02K 1/22 | (2006.01) |
| H02K 11/20 | (2016.01) |
| H02K 1/12 | (2006.01) |
| H02K 7/20 | (2006.01) |
| H02K 21/02 | (2006.01) |

(52) U.S. Cl.
CPC .............. *H02K 11/20* (2016.01); *H02K 1/12* (2013.01); *H02K 1/22* (2013.01); *H02K 7/20* (2013.01); *H02K 21/027* (2013.01)

(58) Field of Classification Search
CPC .................................................. H02K 11/20
USPC ................................................. 318/540, 538
See application file for complete search history.

(56) References Cited

U.S. PATENT DOCUMENTS

| | | | |
|---|---|---|---|
| 5,627,419 A | 5/1997 | Miller | |
| 6,204,587 B1 * | 3/2001 | Torok | H02K 1/246 310/168 |
| 6,455,975 B1 | 9/2002 | Raad et al. | |
| 6,555,941 B1 | 4/2003 | Zepp et al. | |
| 7,408,278 B2 | 8/2008 | Murota et al. | |
| 8,294,404 B2 | 10/2012 | Stiesdal et al. | |
| 2010/0264768 A1 | 10/2010 | Alfermann et al. | |
| 2013/0028737 A1 | 1/2013 | Kuo | |
| 2015/0171721 A1 | 6/2015 | Seo et al. | |

FOREIGN PATENT DOCUMENTS

| | | |
|---|---|---|
| JP | S5996846 A | 6/1984 |
| WO | WO-2008006906 A1 | 1/2008 |
| WO | WO-2015200104 A1 | 12/2015 |

OTHER PUBLICATIONS

Search Report from corresponding European Application No. 17166014.5 dated Sep. 13, 2017.

* cited by examiner

*Primary Examiner* — David S Luo
(74) *Attorney, Agent, or Firm* — Locke Lord LLP; Scott D. Wofsy; Joshua L. Jones

(57) ABSTRACT

An electrical machine system includes a stator having a conical stator surface defining a rotary axis. A rotor is operatively connected to the stator for rotation relative thereto, wherein the rotor includes a conical rotor surface. A conical gap is defined between the conical surfaces of the stator and rotor about the rotary axis. An actuator is operatively connected to at least one of the stator and rotor for relative linear motion along the rotary axis of the stator and rotor to change the conical gap, wherein the actuator provides relative linear motion between a first position for a first conical gap width and a second position for a second conical gap width different form the first conical gap width. In both the first and second positions the full axial length of one of the rotor or stator is axially within the axial length of the other.

20 Claims, 2 Drawing Sheets

VARIABLE GAP ELECTRICAL MACHINES

BACKGROUND OF THE INVENTION

1. Field of the Invention

The present disclosure relates to electrical machines, and more particularly to electrical machines such as used in aerospace and other applications.

2. Description of Related Art

Controlling output voltage of electrical machines, e.g., generators, across a variable speed range or variable loading generally requires complex external controls to boost or reduce the voltage to meet the desired output voltage required. An example is when a generator is driven by a gas turbine engine aboard an aircraft. The voltage tends to vary as the speed of the engine varies during a taxi, take off, climbing, cruising, loitering, descending, landing, and idling. However, the electrical components depending on power from the generator require a relatively constant input voltage. The complex external controls described above are traditionally required to ensure the voltage provided by the generator is constant regardless of the engine speed.

Such conventional methods and systems have generally been considered satisfactory for their intended purpose. However, there is still a need in the art for improved electrical machines. The present disclosure provides a solution for this need.

SUMMARY OF THE INVENTION

An electrical machine system includes a stator having a conical stator surface defining a rotary axis. A rotor is operatively connected to the stator for rotation relative thereto, wherein the rotor includes a conical rotor surface. A conical gap is defined between the conical surfaces of the stator and rotor about the rotary axis. An actuator is operatively connected to at least one of the stator and rotor for relative linear motion along the rotary axis of the stator and rotor to change the conical gap, wherein the actuator provides relative linear motion between a first position for a first conical gap width and a second position for a second conical gap width different form the first conical gap width. In both the first and second positions the full axial length of one of the rotor or stator is axially within the axial length of the other.

The rotor can be radially within the stator. The stator can be longer in the axial direction than the rotor, wherein the actuator provides relative linear motion between a first position for maximal conical gap and a second position for minimal conical gap, wherein in both the first and second positions the full axial length of the rotor is axially within the axial length of the stator. The rotor can be longer in the axial direction than the stator, wherein the actuator provides relative linear motion between a first position for maximal conical gap and a second position for minimal conical gap, wherein in both the first and second positions the full axial length of the stator is axially within the axial length of the rotor.

A shaft can be operatively connected for common rotation with the rotor, wherein the actuator is operatively connected to drive the shaft back and forth along the rotary axis thereby moving the rotor axially relative to the stator to vary the conical gap. The actuator can be operatively connected to drive the stator back and forth along the rotary axis thereby driving the stator relative to the rotor axially to vary the gap.

The rotor and stator can be configured to operate as a generator, e.g., a permanent magnet generator, further comprising a controller operatively connected to sense input including at least one of generator rotational speed, generator winding current, or output voltage from the generator and to control the actuator to adjust the gap based on the input. The rotor and stator can be configured to operate as a motor, wherein a controller is operatively connected to sense input including at least one of back-emf voltage from the motor, motor winding current, or rotor speed and to control the actuator to adjust the gap based on the input.

A method of controlling an electrical machine axially moving a rotor relative to a stator, wherein there is a conical gap separating between a conical surface of the rotor and a conical surface of the stator, wherein rotor and stator move relative to one another between a first position for a first conical gap width and a second position with a second conical gap width different from the first conical gap width, wherein in both the first and second positions the full axial length of one of the rotor or stator is axially within the axial length of the other.

Axially moving the conical rotor relative to a conical stator can include operating the rotor and stator as a generator, wherein the method includes controlling the gap between the first and second gap widths to provide a constant output voltage from the generator across a range of speed. Axially moving the conical rotor relative to a conical stator can include operating the rotor and stator as a generator, wherein the method includes controlling the gap between the first and second gap widths to provide a constant output voltage from the generator across a range of loads.

Axially moving the conical rotor relative to a conical stator can include operating the rotor and stator as a generator, wherein the method includes controlling the gap in response to a fault in the generator and/or loads powered by the generator to reduce the energy feeding the fault. Controlling the gap in response to a fault can include reducing the gap to a point that the conical surface of the rotor touches down on the conical surface of the stator to stop relative rotation of the rotor and stator.

Axially moving the conical rotor relative to a conical stator can include operating the rotor and stator as a motor, wherein the method includes controlling the gap to increase motor speed by reducing back-emf voltage with reduced non-torque producing current relative to what would be required if the gap were not increased. The method can include increasing the gap while the rotor accelerates or decelerates through one or more critical speeds to reduce likelihood of rotor touchdown.

The stator can be longer in the axial direction than the rotor, wherein an actuator provides relative linear motion between a first position for maximal conical gap and a second position for minimal conical gap, wherein in both the first and second positions the full axial length of the rotor is axially within the axial length of the stator. The rotor can be longer in the axial direction than the stator, wherein an actuator provides relative linear motion between a first position for maximal conical gap and a second position for minimal conical gap, wherein in both the first and second positions the full axial length of the stator is axially within the axial length of the rotor.

The rotor and stator can be configured to operate as a generator, wherein the method includes using a controller operatively connected to sense input including at least one of generator rotational speed, generator winding current, or output voltage from the generator to control the actuator to adjust the gap based on the input.

The rotor and stator can be configured to operate as a motor, wherein the method includes using a controller operatively connected to sense input including at least one of back-emf voltage from the motor, motor winding current, or rotor speed to control the actuator to adjust the gap based on the input.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
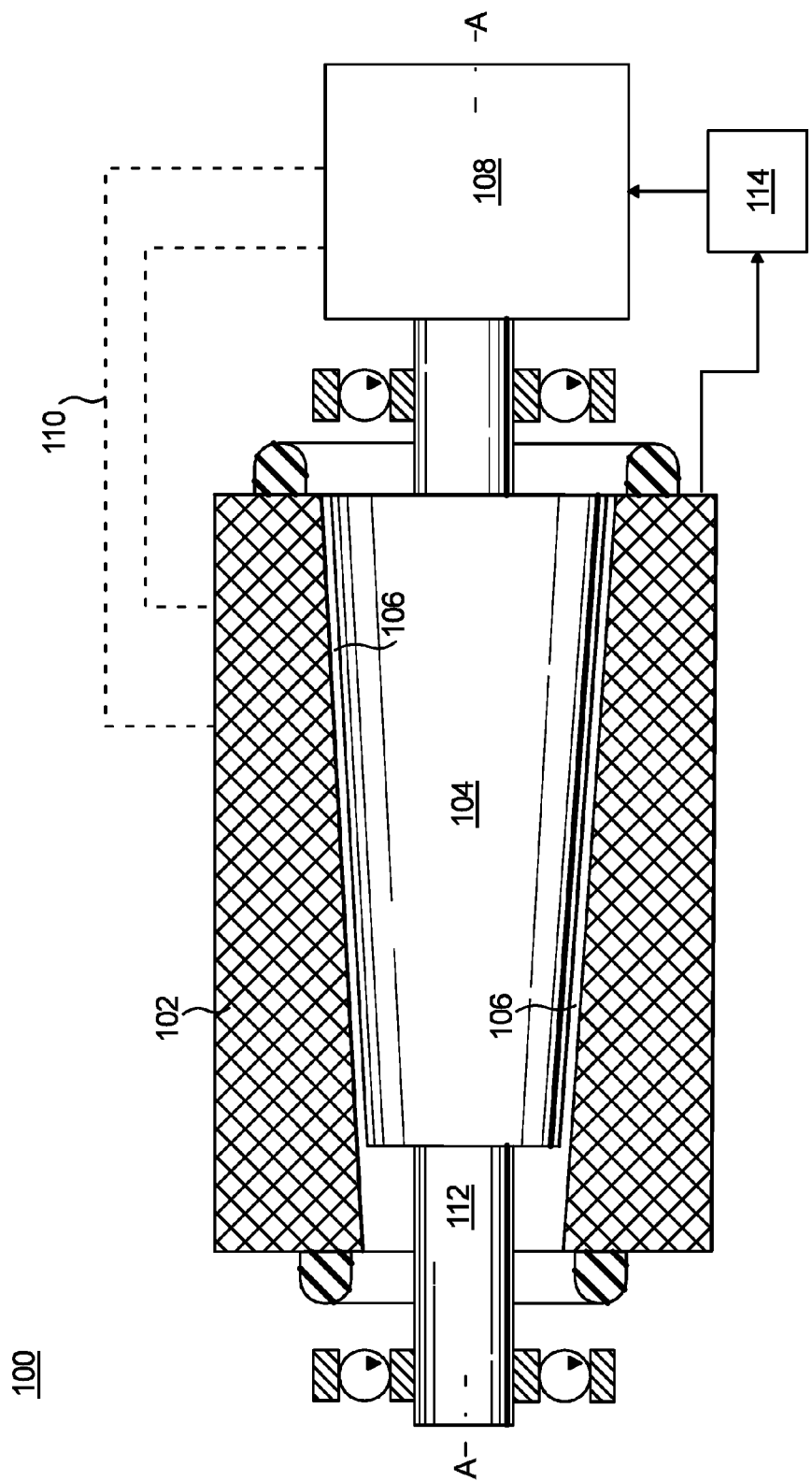
FIG. 1 is a schematic cross-sectional side elevation view of an exemplary embodiment of an electrical machine constructed in accordance with the present disclosure, showing the shaft and rotor in a first position.

Reference will now be made to the drawings wherein like reference numerals identify similar structural features or aspects of the subject disclosure. For purposes of explanation and illustration, and not limitation, a partial view of an exemplary embodiment of an electrical machine in accordance with the disclosure is shown in FIG. 1 and is designated generally by reference character 100. Other embodiments of electrical machines in accordance with the disclosure, or aspects thereof, are provided in FIG. 2, as will be described. The systems and methods described herein can be used for improved electrical machine operation.

An electrical machine system 100 includes a conical stator 102, e.g., having a conical inward facing surface, defining a rotary axis A and a conical rotor 104, e.g., having a conical outward facing surface opposed to the conical surface of the stator 102. A conical gap 106 is defined between the conical surfaces of stator 102 and rotor 104 about the rotary axis A. An actuator 108 is operatively connected to rotor 104 for relative linear motion along the rotary axis A of the stator 102 and rotor 104 to change the width of conical gap 106. It is contemplated that the gap 106 can be substantially axisymmetric, i.e., non-eccentric.

Figure 2:
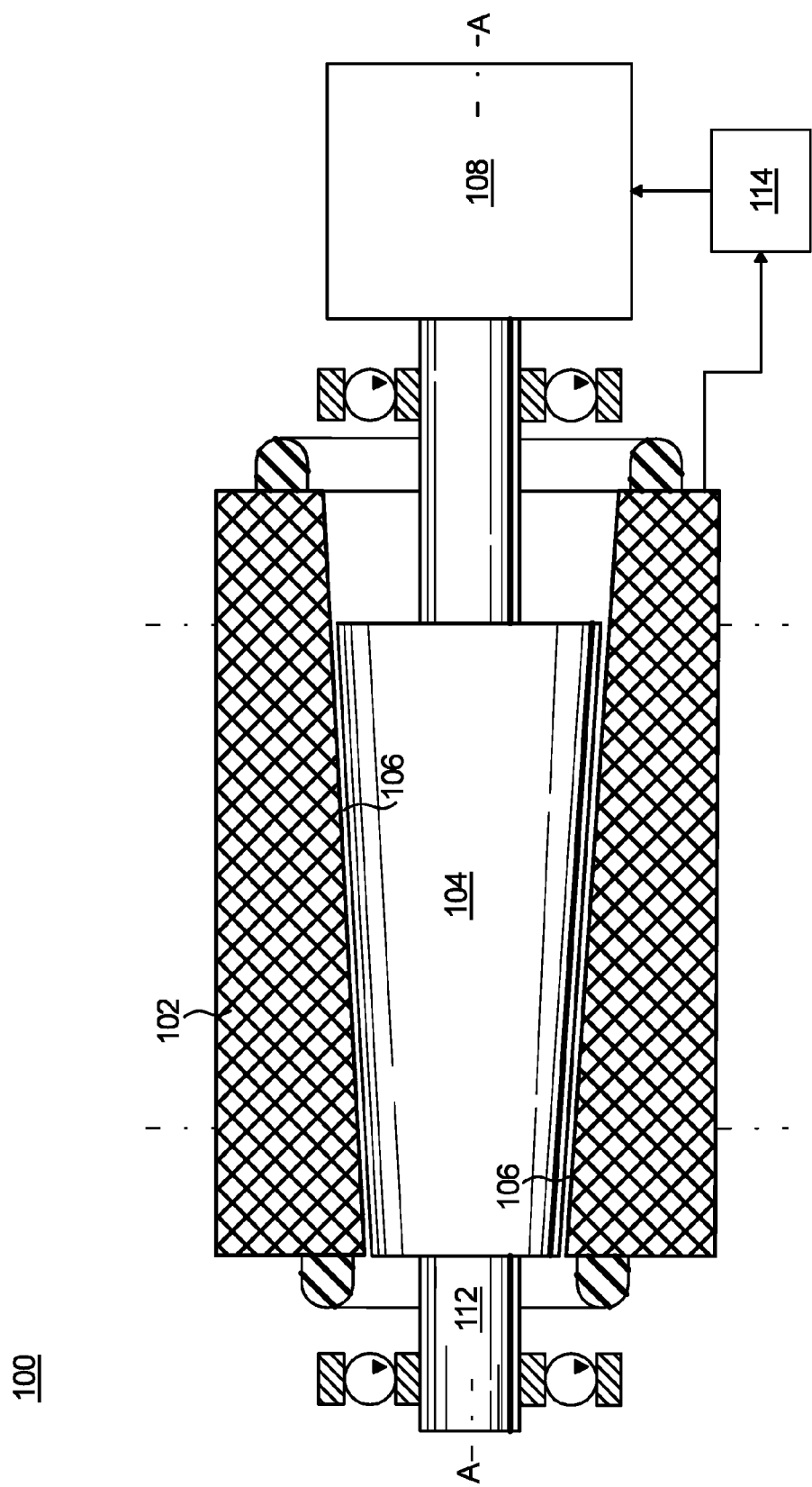
FIG. 2 is a schematic cross-sectional side elevation view of the electrical machine of FIG. 1, showing the shaft and rotor in a second position with a smaller gap between the rotor and stator than in the first position shown in FIG. 1.

The actuator 108 provides relative linear motion along axis A between a first position for maximal conical gap 106, shown in FIG. 1, and a second position for minimal conical gap 106, shown in FIG. 2. In both the first and second positions the full axial length of one of the rotor 104 or stator 102 is axially within the axial length of the other. Rotor 104 is radially within the stator 102. The stator 102 is longer in the axial direction of axis A than the rotor 104, so in both the first and second positions the full axial length of the rotor 104 is axially within the axial length of the stator 102 along axis A. A shaft 112 is operatively connected for common rotation with the rotor 104, wherein the actuator 108 is operatively connected to drive the shaft 112 back and forth along the rotary axis A thereby driving the rotor 104 relative to the stator 102 axially to vary the gap 106. While shown and described with the exemplary embedment wherein the actuator moves the rotor 104 relative to the stator 102, those skilled in the art will readily appreciate that the relative motion can also be achieved with an actuator moving stator 102 instead (e.g., connecting through connection 110 shown in broken lines in FIG. 1), or both rotor 104 and stator 104 may be actuated without departing from the scope of this disclosure.

While shown in the exemplary context of having the stator 102 longer than the rotor 104 in the axial direction, it is also contemplated that in embodiments the rotor 104 is longer in the axial direction than the stator 120. For example, if the length of the stator 102 were limited to between the vertical dashed lines in FIG. 2, in both the first and second positions the full axial length of the stator 102 would be axially within the axial length of the rotor 104.

The rotor 104 and stator 102 can be configured to operate as a generator, e.g., a permanent magnet generator, wherein the system includes a controller 114 operatively connected to sense input including at least one of generator rotational speed, generator winding current, or output voltage from the generator (as indicated by the arrow into the controller 114) and to control the actuator 108 to adjust the gap 106 based on the input, as indicated by the arrow out of controller 114. It is also contemplated that the rotor 104 and stator 102 can be configured to operate as a motor, wherein the controller 114 is operatively connected to sense input including at least one of back-emf voltage from the motor, current supplied to the motor windings, or rotor speed and to control the actuator 108 to adjust the gap 106 based on the input. Moreover, controller 114 can be configured to operate rotor 104 and stator 102 as a motor/generator by switching modes between a generating mode and a motoring mode, as in a starter motor/generator for aerospace applications, for example.

A method of controlling an electrical machine includes axially moving a conical rotor, e.g. rotor 104, relative to a conical stator, e.g., stator 102, wherein there is a conical gap, e.g., gap 106 separates between the rotor and stator, wherein rotor and stator move relative to one another between a first position maximizing the gap and a second position minimizing the gap. In both the first and second positions the full axial length of one of the rotor or stator is axially within the axial length of the other.

Axially moving the conical rotor relative to a conical stator can include operating the rotor and stator as a generator and the method can include controlling the gap to provide a constant output voltage from the generator across a range of speed. It is also contemplated that axially moving the conical rotor relative to a conical stator can include operating the rotor and stator as a generator, wherein the method includes controlling the gap to provide a constant output voltage from the generator across a range of loads. In generator mode, the method can also include controlling the gap in response to a fault in the generator and/or loads powered by the generator to reduce the energy feeding the fault. Controlling the gap in response to a fault can include reducing the gap to a point that the rotor touches down on the stator. This quickly brings the generator to a stop and concentrates the fault energy between the inner diameter of the stator and the rotor which is generally designed to contain such a fault rather than in the area of the actual fault which may not be designed to handle the energy.

Axially moving the conical rotor relative to a conical stator can include operating the rotor and stator as a motor, wherein the method includes controlling the gap to increase motor speed by reducing back-emf voltage with reduced non-torque producing current relative to what would be required if the gap were not increased. The method can include increasing the gap while the rotor accelerates or decelerates through one or more critical speeds to reduce likelihood of rotor touchdown.

The methods and systems of the present disclosure, as described above and shown in the drawings, provide for electrical machines with superior properties including control of the gap between the rotor and the stator. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electrical machine system comprising:
 a stator having a conical stator surface defining a rotary axis;
 a rotor operatively connected to the stator for rotation relative thereto, wherein the rotor includes a conical rotor surface, wherein a conical gap is defined between the conical surfaces of the stator and rotor about the rotary axis; and
 an actuator operatively connected to at least one of the stator and rotor for relative linear motion along the rotary axis of the stator and rotor to change the conical gap, wherein the actuator provides relative linear motion between a first position for a first conical gap width and a second position for a second conical gap width different form the first conical gap width, wherein in both the first and second positions the full axial length of one of the rotor or stator is axially within the axial length of the other.

2. A system as recited in claim 1, wherein the rotor is radially within the stator.

3. A system as recited in claim 2, wherein the stator is longer in the axial direction than the rotor, wherein the actuator provides relative linear motion between a first position for maximal conical gap and a second position for minimal conical gap, wherein in both the first and second positions the full axial length of the rotor is axially within the axial length of the stator.

4. A system as recited in claim 2, further comprising a shaft operatively connected for common rotation with the rotor, wherein the actuator is operatively connected to drive the shaft back and forth along the rotary axis thereby moving the rotor axially relative to the stator to vary the conical gap.

5. A system as recited in claim 1, wherein the rotor is longer in the axial direction than the stator, wherein the actuator provides relative linear motion between a first position for maximal conical gap and a second position for minimal conical gap, wherein in both the first and second positions the full axial length of the stator is axially within the axial length of the rotor.

6. A system as recited in claim 1, wherein the actuator is operatively connected to drive the stator back and forth along the rotary axis thereby driving the stator relative to the rotor axially to vary the gap.

7. A system as recited in claim 1, wherein the rotor and stator are configured to operate as a generator, further comprising a controller operatively connected to sense input including at least one of generator rotational speed, generator winding current, or output voltage from the generator and to control the actuator to adjust the gap based on the input.

8. A system as recited in claim 1, wherein the rotor and stator are configured to operate as a motor, further comprising a controller operatively connected to sense input including at least one of back-emf voltage from the motor, motor winding current, or rotor speed and to control the actuator to adjust the gap based on the input.

9. A system as recited in claim 1, wherein the rotor and stator operatively connected as a permanent magnet generator.

10. A method of controlling an electrical machine comprising:
 axially moving a rotor relative to a stator, wherein there is a conical gap separating between a conical surface of the rotor and a conical surface of the stator, wherein rotor and stator move relative to one another between a first position for a first conical gap width and a second position with a second conical gap width different from the first conical gap width, wherein in both the first and second positions the full axial length of one of the rotor or stator is axially within the axial length of the other.

11. A method as recited in claim 10, wherein axially moving the conical rotor relative to a conical stator includes operating the rotor and stator as a generator, further comprising controlling the gap between the first and second gap widths to provide a constant output voltage from the generator across a range of speed.

12. A method as recited in claim 10, wherein axially moving the conical rotor relative to a conical stator includes operating the rotor and stator as a generator, further comprising controlling the gap between the first and second gap widths to provide a constant output voltage from the generator across a range of loads.

13. A method as recited in claim 10, wherein axially moving the conical rotor relative to a conical stator includes operating the rotor and stator as a generator, further comprising controlling the gap in response to a fault in the generator and/or loads powered by the generator to reduce the energy feeding the fault.

14. A method as recited in claim 13, wherein controlling the gap in response to a fault includes reducing the gap to a point that the conical surface of the rotor touches down on the conical surface of the stator to stop relative rotation of the rotor and stator.

15. A method as recited in claim 10, wherein axially moving the conical rotor relative to a conical stator includes operating the rotor and stator as a motor, further comprising controlling the gap to increase motor speed by reducing back-emf voltage with reduced non-torque producing current relative to what would be required if the gap were not increased.

16. A method as recited in claim 10, further comprising increasing the gap while the rotor accelerates or decelerates through one or more critical speeds to reduce likelihood of rotor touchdown.

17. A method as recited in claim 10, wherein the stator is longer in the axial direction than the rotor, wherein an actuator provides relative linear motion between a first position for maximal conical gap and a second position for minimal conical gap, wherein in both the first and second positions the full axial length of the rotor is axially within the axial length of the stator.

18. A method as recited in claim 10, wherein the rotor is longer in the axial direction than the stator, wherein an actuator provides relative linear motion between a first position for maximal conical gap and a second position for minimal conical gap, wherein in both the first and second positions the full axial length of the stator is axially within the axial length of the rotor.

19. A method as recited in claim 10, wherein the rotor and stator are configured to operate as a generator, further comprising using a controller operatively connected to sense input including at least one of generator rotational speed, generator winding current, or output voltage from the generator to control the actuator to adjust the gap based on the input.

20. A method as recited in claim 10, wherein the rotor and stator are configured to operate as a motor, further comprising using a controller operatively connected to sense input including at least one of back-emf voltage from the motor, motor winding current, or rotor speed to control the actuator to adjust the gap based on the input.

* * * * *